ми

US009084106B1

(12) United States Patent
Alberts et al.

(10) Patent No.: US 9,084,106 B1
(45) Date of Patent: Jul. 14, 2015

(54) REMOTE CONTROLLER FOR MOBILE DEVICE

(71) Applicants: Scott Alberts, Saratoga, CA (US); Peter Moran, Los Altos, CA (US); Stella Jin, Palo Alto, CA (US); Kewei Yang, Saratoga, CA (US); Ning Zhu, San Jose, CA (US)

(72) Inventors: Scott Alberts, Saratoga, CA (US); Peter Moran, Los Altos, CA (US); Stella Jin, Palo Alto, CA (US); Kewei Yang, Saratoga, CA (US); Ning Zhu, San Jose, CA (US)

(73) Assignee: Analogix Semiconductor, Inc., Santa Clara, CA (US)

( * ) Notice: Subject to any disclaimer, the term of this patent is extended or adjusted under 35 U.S.C. 154(b) by 201 days.

(21) Appl. No.: 13/761,013

(22) Filed: Feb. 6, 2013

Related U.S. Application Data

(60) Provisional application No. 61/724,856, filed on Nov. 9, 2012.

(51) Int. Cl.
*G08C 19/16* (2006.01)
*H04W 8/24* (2009.01)

(52) U.S. Cl.
CPC ........................................ *H04W 8/24* (2013.01)

(58) Field of Classification Search
CPC ........... H05B 37/0272; H05B 33/0809; H05B 33/0842; H05B 33/0854; H02J 9/02; H02J 7/0047; H02J 2007/005; H02J 2007/0067; H02J 7/0063; H02J 7/025; H02J 9/061; H02J 9/065; H02J 7/0021; H02J 7/34
USPC ............. 340/12.29, 286.01, 323 R, 988, 933, 340/941, 501–509, 515, 488, 446–448
See application file for complete search history.

(56) References Cited

U.S. PATENT DOCUMENTS

| | | | | |
|---|---|---|---|---|
| 4,977,612 A | * | 12/1990 | Wilson | 455/166.1 |
| 2003/0122876 A1 | * | 7/2003 | Berlad et al. | 345/773 |
| 2008/0192003 A1 | * | 8/2008 | Kondo et al. | 345/156 |
| 2009/0069002 A1 | * | 3/2009 | Shin | 455/419 |
| 2011/0230178 A1 | * | 9/2011 | Jones et al. | 455/422.1 |
| 2012/0140124 A1 | * | 6/2012 | Moroney et al. | 348/734 |

* cited by examiner

*Primary Examiner* — Daniel Previl
(74) *Attorney, Agent, or Firm* — Carr & Ferrell LLP

(57) ABSTRACT

A remote controller for a mobile device is described. The remote controller includes a communications transceiver configured for bidirectional communications with the mobile device, and a computer processing system communicatively coupled to the communications transceiver. The computer processing system may be configured to execute instructions to remotely control one or more applications associated with the mobile device. Examples of applications include media playback applications, software updating applications, and the like. The remote controller may also include one or more actuators communicatively coupled to the computer processing system, the one or more actuators being configured to receive user input to control or access the one or more applications. Additionally, the remote controller may include a screen.

26 Claims, 8 Drawing Sheets

REMOTE CONTROLLER FOR MOBILE DEVICE

CROSS REFERENCE TO RELATED APPLICATIONS

This application claims the benefit of U.S. Provisional Patent Application Ser. No. 61/724,856, filed on Nov. 9, 2012, which is incorporated herein by reference in its entirety.

BACKGROUND

Mobile devices are becoming increasingly popular due to their numerous applications, portability, and rich content. There are situations, however, when a mobile device can lose its "mobility". For example, when charging, a mobile device is attached by a wire to a utility grid. Additionally, the mobile device may be connected by a wire to various electronic devices, such as TVs, computers, and audio or video systems to provide control for these electronic devices or to exchange data and content between the mobile device and these electronic devices. Thus, sometimes, the "mobility" of the mobile device can be limited.

SUMMARY

Provided are devices, methods and systems for remote controlling a mobile device. In general, these devices, methods and systems are designed to allow a user to remotely control the mobile device.

In certain embodiments, a remote controller includes a communications transceiver configured for bidirectional communications with the mobile device. In further embodiments, the remote controller includes a computer processing system communicatively coupled to the communications transceiver, the computer processing system being configured to execute instructions to remotely control one or more applications associated with the mobile device. Furthermore, the remote controller may include one or more acoustic transducers communicatively coupled to the computer processing system, the one or more acoustic transducers being configured to enable acoustic communications associated with the mobile device. In further embodiments, the remote controller includes one or more actuators communicatively coupled to the computer processing system, the one or more actuators being configured to receive user input. The user input may remotely control the one or more applications. The remote controller may also include a screen.

In certain embodiments, a method for controlling a mobile device using a remote controller includes establishing, via a processor associated with the remote controller, a communication channel between the remote controller and the mobile device. In various embodiments, the method involves receiving, by the remote controller, one or more commands for controlling the mobile device. Furthermore, the method may include transmitting, by the remote controller via the communication channel, the one or more commands to the mobile device. In further embodiments, the method involves providing a response, by an application executed by a processor of the mobile device, responsive to the one or more commands.

In some embodiments, a system for controlling a mobile device using a remote controller includes a mobile device and one or more remote controllers for the mobile device. The remote controllers of the system may be in communication with the mobile device via a wireless protocol. In certain embodiments, the remote controllers includes communications transceivers configured for bidirectional communications with the mobile device. The remote controllers may further include a computer processing system communicatively coupled to the communications transceiver, wherein the computer processing system includes a microcontroller and one or more of the following: a touch controller, a Liquid Crystal Display (LCD) driver, an audio digital-to-analog convertor, a wireless transceiver, the computer processing system being configured to execute instructions to remotely control one or more applications associated with the mobile device. In some embodiments, the remote controllers include acoustic transducers communicatively coupled to the computer processing system and configured to enable acoustic communications associated with the mobile device. In further embodiments, the remote controllers include actuators communicatively coupled to the computer processing system and configured to receive user input. The user input may cause commands to be transmitted that remotely control the one or more applications. Also, in some embodiments, the remote controllers include a screen.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
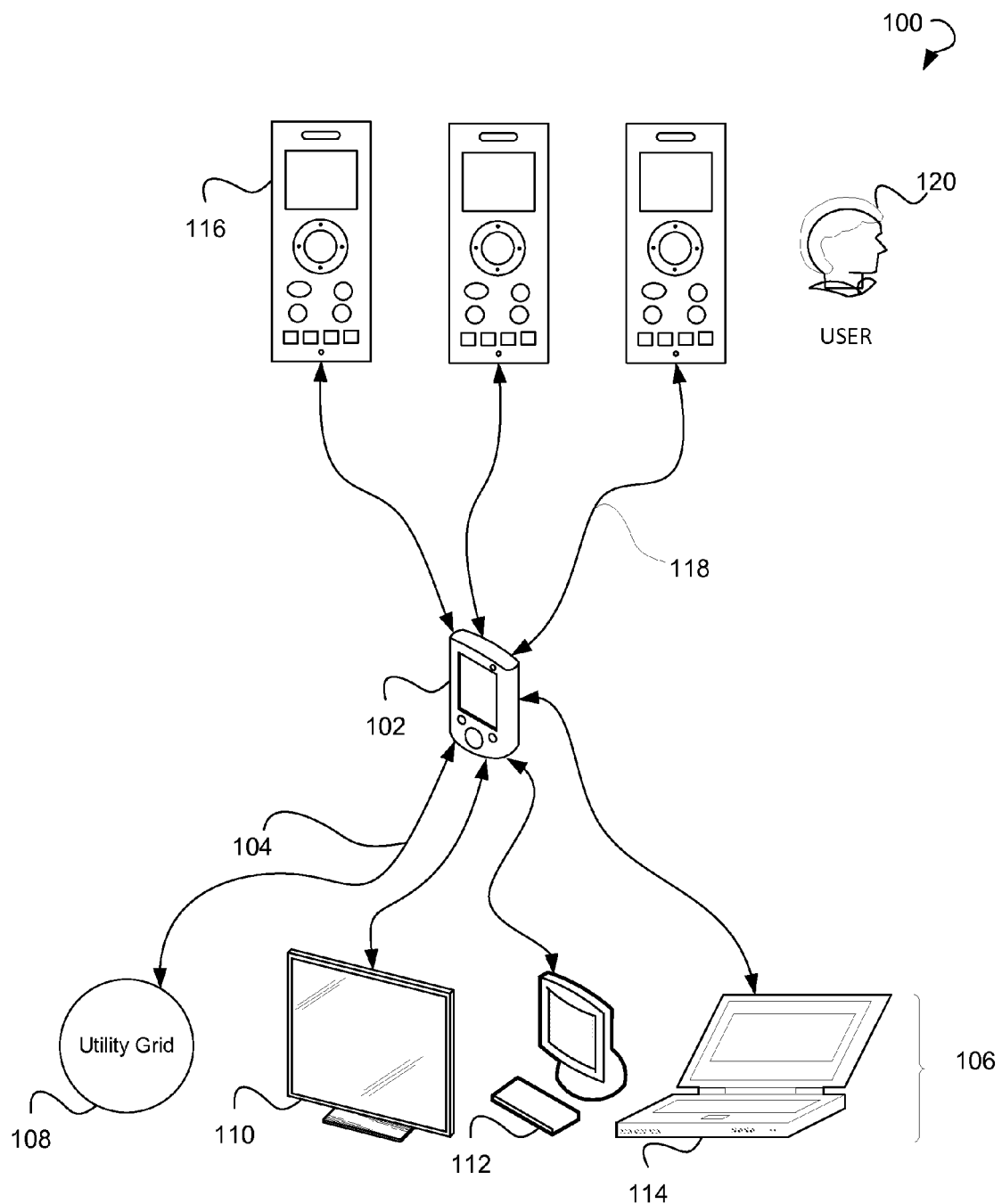
FIG. 1 is a block diagram showing a sample environment within which methods and systems for remote control of the mobile device are implemented, in accordance with an example embodiment.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Methods and systems described herein may allow a user of a mobile device, such as for example, a smart phone, to control various applications associated with the mobile device from a remote controller. For example, a user may be able to answer and place telephone calls from the remote control.

A remote controller for a mobile device may be utilized when, for example, the mobile device cannot be moved beyond a certain area. Such situations may occur, for example, when the mobile device is being charged. The mobile device may also, in some instances, be communicatively coupled, for example, using a High-Definition Multimedia Interface (HDMI) output port or micro (Universal Serial Bus) USB port embedding SLIMPORT or a Mobile High-Definition Link (MHL) function, to another device, such as a computer, TV screen, video or audio control system, and the like. In such situations, if the user, for example, needs to use the mobile device, he or she will be restricted in his or her movements while using the mobile device. The remote controller may extend the reach of the mobile device in such circumstances. In other words, the remote controller may allow a user to control operations of the mobile device remotely, without being in physical contact with the mobile device. The remote controller of the mobile device may allow the user to accept or decline incoming phone calls or make outgoing phone calls. The remote controller may also permit access and/or control over applications running on the mobile device, such as navigating menus and/or controlling video stream playback on the mobile device. This remote controller may communicate with the mobile device via a wireless protocol, and, in exemplary embodiments, may have low power consumption compared to the mobile device so that the remote controller may not need to be charged or have the battery replaced for up to two to three years, for example.

In some embodiments, the remote controller may comprise a communications transceiver performing bidirectional communications with the mobile device. These bidirectional communications may include wireless communications, such as BLUETOOTH, WI-FI, NFC (Near Field Communication), and so forth.

In some embodiments, the remote controller may include a computer processing system. The computer system may be configured to execute instructions to remotely control the mobile device and/or one or more applications associated with the mobile device. Exemplary applications may include media playback applications and/or applications that update software on the mobile device (e.g., device firmware, downloading application updates, and the like).

In one example embodiment, the remote controller is able to accept and make phone calls. The associated sound transmission and/or generation may be performed by acoustic transducers associated with the remote controller.

In some example embodiments, a user inputs his commands on the remote controller via actuators that may include a set of buttons, a touch screen, and so forth.

Referring now to the drawings, FIG. 1 is a block diagram showing a sample environment within which methods and systems for remote control of the mobile device may be implemented, in accordance with certain example embodiments. FIG. 1 shows an architecture 100 that may include a mobile device 102, such as a smart phone or the like, communicatively coupled (via, for example, cable 104, a dock, or any suitable way of coupling two devices) to electronic devices 106. Examples of electronic devices 106 include a utility grid 108, a TV 110, a computer 112, a laptop 114, and so forth. Furthermore, the architecture 100 may include a remote controller 116 connected via a bidirectional communication network 118 to the mobile device 102. The bidirectional communications may include wireless communications that may employ one or more of the following technologies: BLUETOOTH, WI-FI, and NFC. The remote controller 116 can be controlled by a user 120. The remote controller 116 wirelessly connected to the mobile device 102 may be used to remotely control the mobile device 102 while the mobile device 102 is coupled or connected to the utility grid 108 or any electronic devices 106, thereby temporarily reducing the "mobility" of the mobile device 102. Under these circumstances, user 120 can utilize remote controller 116 to take or make a phone call or even control applications on the mobile device 102, such as controlling video playback on the screen of TV 110.

FIG. 1 illustrates an example embodiment with the mobile device 102 being connected to the utility grid 108, for example, by being electrically or magnetically coupled to a charging device such as a wall charger. Thus, it may be convenient to have the remote controller 116 provide mobile telephone functionality while the mobile device 102 is being charged.

As shown in FIG. 1, the mobile device 102 may be coupled or connected to the TV 110 through its AV output port. The mobile device 102 may be coupled or connected to the computer 112 or the laptop 114. The mobile device 102 may be connected to one of the electronic devices 106 using one or more of the following: a High-Definition Multimedia Interface (HDMI) output port and/or micro (Universal Serial Bus) USB port embedding SLIMPORT or Mobile High-Definition Link (MHL) function.

Figure 2:
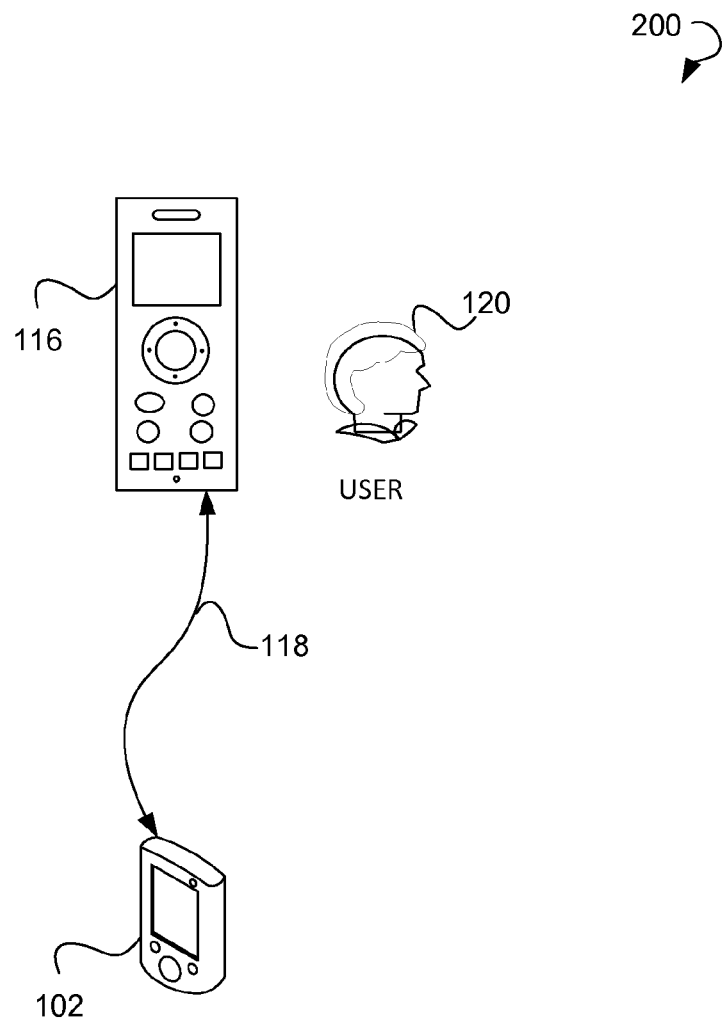
FIG. 2 is a block diagram illustrating a system for remote control of the mobile device, in accordance with an example embodiment.

FIG. 2 is a block diagram 200 illustrating example interactions between the mobile device 102 and the remote controller 116. According to various embodiments, the mobile device 102 is connected to one remote controller 116. Such embodiments may be useful when the mobile device 102 is being charged or is connected to another device.

Figure 3:
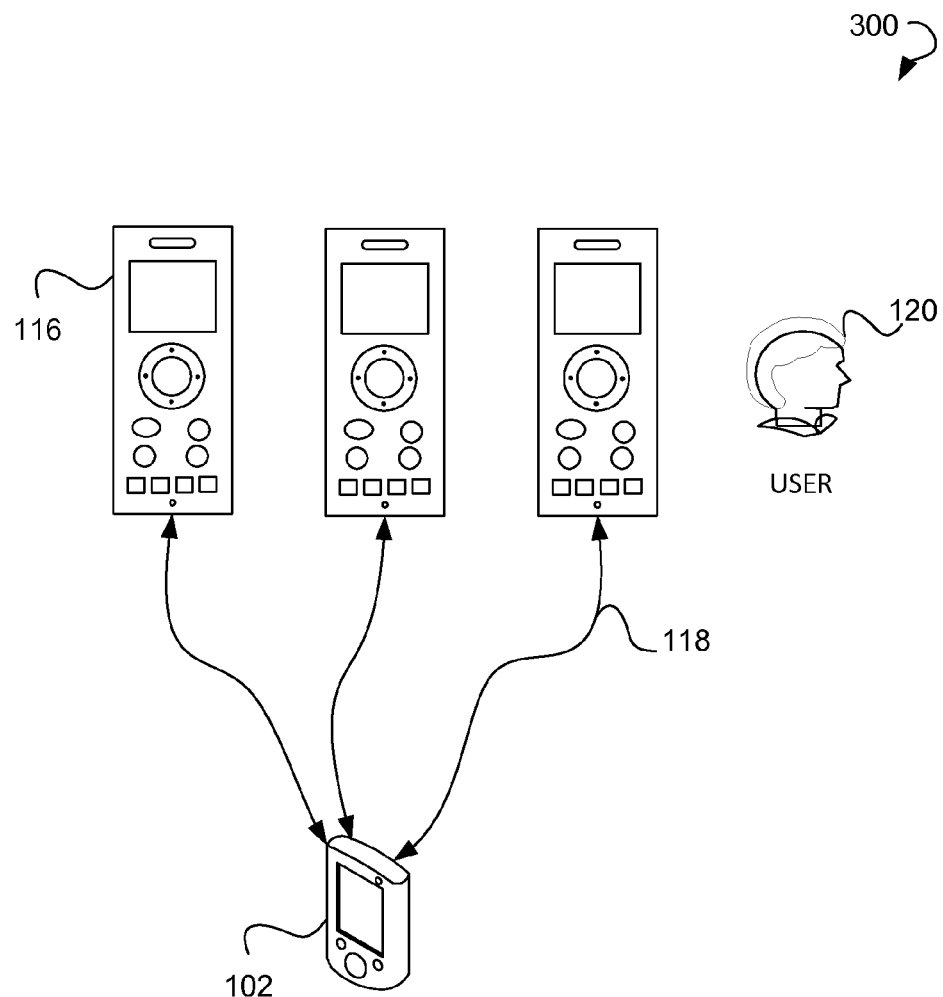
FIG. 3 is a block diagram illustrating a system for remote control of the mobile device, in accordance with an example embodiment.

FIG. 3 is a block diagram 300 illustrating a system for remote control of the mobile device 102, in accordance with an example embodiment. As shown in FIG. 3, multiple remote controllers 116 may be communicatively coupled to one mobile device 102, so that every remote controller 116 may be used to access and/or control applications on the mobile device 102. This can be helpful in households with multiple rooms, so that a user may have access to a remote controller 116 in different rooms (e.g., kitchen, bedroom, bathroom and so forth). The user 120 may accordingly answer phone calls and/or control applications, such as audio playback applications or device update applications, without having to move the mobile device 102 from one room to another.

Figures 4A, 4B:
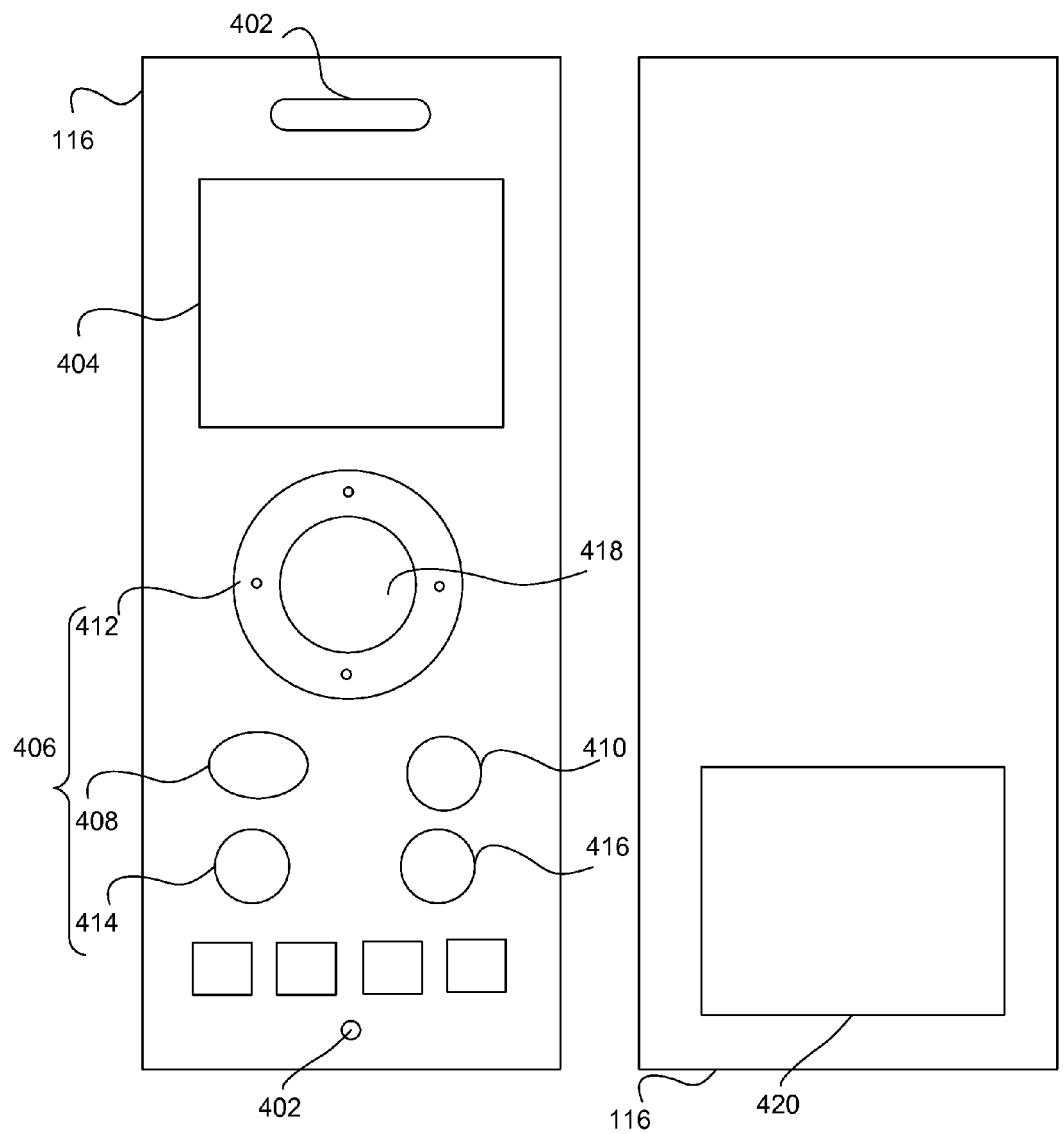
FIG. 4A is a schematic representation of a front view of a remote controller for a mobile device, in accordance with an example embodiment.
FIG. 4B is a schematic representation of a rear view of a remote controller for a mobile device, in accordance with an example embodiment.

FIG. 4A shows a front view of a sample remote controller 116 for a mobile device 102. The remote controller 116 may include a communications transceiver (not shown) in communication with the mobile device 102. The communications transceiver may be configured for bidirectional communications with the mobile device 102, such that the remote controller may be used to place telephone calls, initiate media playback, and control various applications installed on the mobile device 102.

The remote controller may also include a computer processing system (not shown) communicatively coupled to the communications transceiver, with the computer processing system executing instructions to remotely control applications associated with the mobile device 102. The computer processing system may include one or more of the following: a touch screen controller, a LCD driver, an audio digital-to-analog convertor, a BLUETOOTH transceiver, and the like.

The remote controller may also include one or more acoustic transducers 402 communicatively coupled to the computer processing system, with the acoustic transducers 402 configured to enable acoustic communications associated with the mobile device 102. The acoustic transducers 402 may include an earphone, a microphone, a sound generating device, or any other device communicatively coupled to the computer processing system.

Furthermore, the remote controller may include a screen. The screen 404 may include one or more of the following: an LCD display, a touch screen, and the like.

The remote controller 116 may also include one or more actuators communicatively coupled to the computer processing system, where the one or more actuators are configured to receive user input. The actuators may be configured to control applications, by receiving a user input by which a user may, for example, navigate menus and/or control video stream playback on the mobile device. The actuators may include one or more of the following: buttons 406 and a screen 404.

The functions of the buttons 408, in exemplary embodiments, include:

A 'Menu' button 408 to view a higher level menu;

A 'Play/Pause' button 410 that, when pressed, switches between play mode and pause mode during media playback (such as video playback and/or audio playback); the 'Play/Pause' button 410 being further configured to open a "Music Player" application when held for a predetermined period of time;

A 'Navigation' button 412 that selects items from a menu when pressed;

A 414 button that answers incoming phone calls when pressed in response to ringing of the remote controller 116 to notify the user 120;

The screen 404, from which the user 120 may check the caller ID and receive additional types of feedback from the mobile device 102;

The button 416 to decline incoming phone calls when pressed;

A button 414 that may access the phone call list when held. The user 120 may subsequently use 'Navigation' button 412 to move up/down, and the user 120 may click button 414 again or click the 'Enter' button 418 to dial out; and wherein the user 120 may view the name in the phone list on the screen 404 when browsing the phone list.

FIG. 4B shows a rear view of an example remote controller 116 for the mobile device 102. FIG. 4B shows a cover 420 for a battery holder. The remote controller 116 may be powered by a 1.5 V button-size battery, or any other suitable power source.

Figure 5:
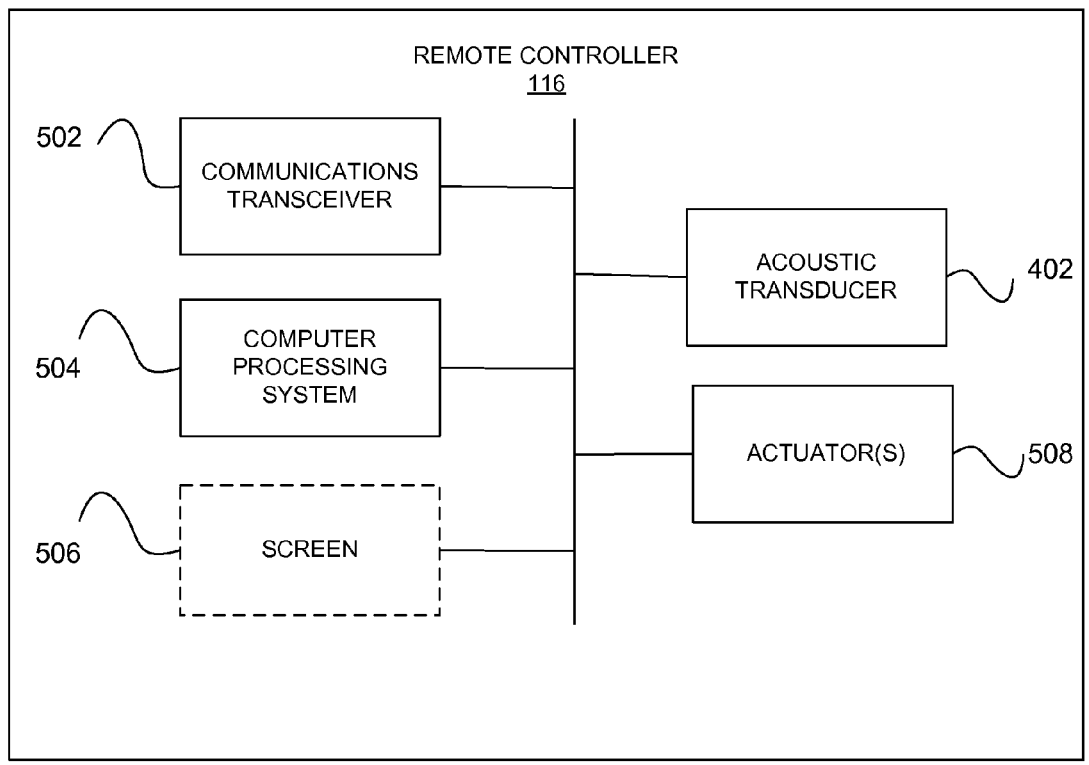
FIG. 5 is a block diagram showing modules of the remote controller for the mobile device, in accordance with an example embodiment.

FIG. 5 illustrates a block diagram with various modules of the remote controller 116 for the mobile device 102, in accordance with certain embodiments. The remote controller 116 may include a communications transceiver 502, a computer processing system 504, an acoustic transducer 402, one or more actuators 508, and a screen 506 (optional).

The communications transceiver 502 may be configured for bidirectional communications with the mobile device 102. The bidirectional communications may include wireless communications, such as BLUETOOTH, WI-FI, NFC and so forth.

The computer processing system 504 may be communicatively coupled to the communications transceiver 502 and configured to execute instructions to remotely control one or more applications associated with the mobile device 102. The computer processing system 504 may include one or more of the following: a touch screen controller, a LCD driver, an audio digital-to-analog convertor, and a BLUETOOTH transceiver.

The acoustic transducers 402 may be communicatively coupled to the computer processing system 504 and configured to enable acoustic communications associated with the mobile device 102. The acoustic transducers 402 may include a sound generating device communicatively coupled to the computer processing system 504.

The actuators 508 may be communicatively coupled to the computer processing system 504 and configured to receive user input. The actuators 508 may be configured to control applications, by receiving the user input by which a user may, for example, navigate menus and/or control video stream playback on the mobile device 102. The actuators 508 may be implemented in a variety of configurations, and may include buttons 406, a screen 404, and the like. The screen may include an LCD display, a touch screen, and the like.

Figure 6:
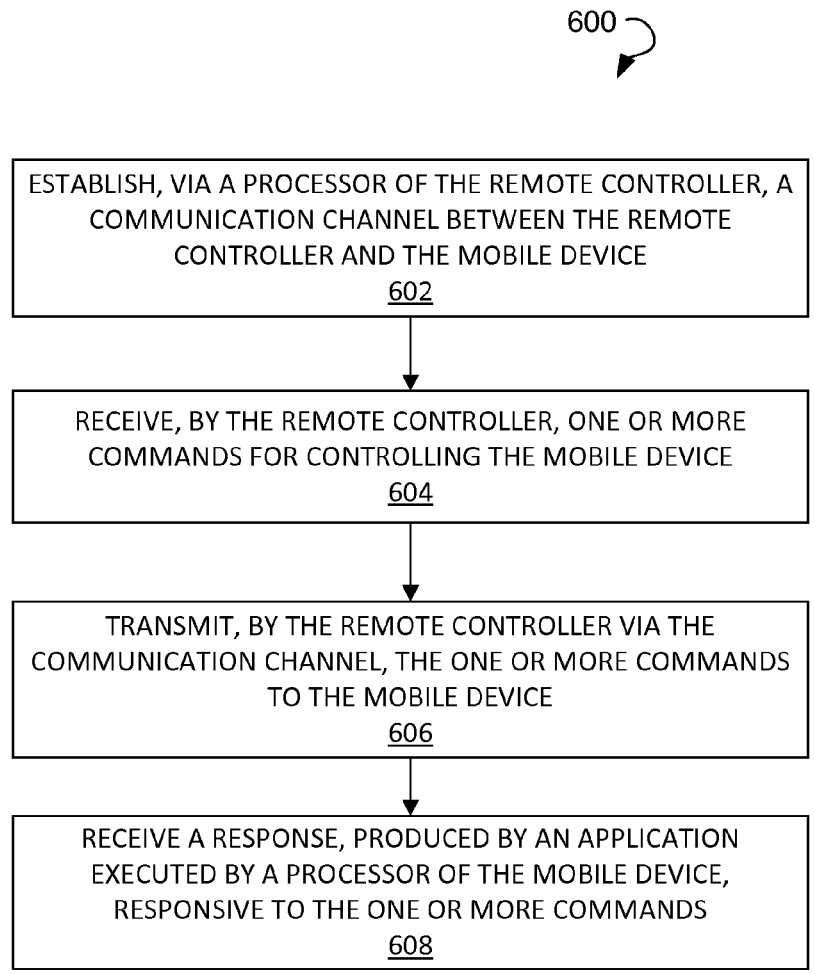
FIG. 6 is a flow chart illustrating a method for controlling a mobile device using a remote controller, in accordance with an example embodiment.

FIG. 6 is a flow chart illustrating a method for controlling a mobile device using a remote controller, in accordance with some example embodiments. The method 600 may commence in operation 602 with establishing, via a processor associated with the remote controller, a communication channel between the remote controller and the mobile device. The communication channel may be established using one or more of the following technologies: BLUETOOTH, WI-FI, and NFC (Near Field Communication).

At operation 604, the remote controller may receive, from the user, one or more commands for controlling applications on the mobile device. The user commands may include acceptance or rejection of incoming phone calls or making outgoing phone calls, as well as controlling applications running on the mobile device, such as navigating menus and/or controlling video stream playback on the mobile device. The commands may be transmitted wirelessly. Furthermore, the commands can be inputted via a screen of the remote controller or via one or more actuators, wherein the actuators may include buttons and a screen. In some embodiments, the processor of the mobile device may facilitate establishing voice calls via the communications channel.

At operation 606, the remote controller may transmit, via the communication channel, the one or more commands to the mobile device. At operation 608, a response may be received, produced by an application executed by a processor of the mobile device, responsive to the one or more commands. In some embodiments, the response to the commands may include an acoustic signal being produced by the application on the mobile device, which may be a media player application. In various embodiments, the response includes a notification of one or more of the following: the command is successfully performed, the availability of additional options required to perform the command, the command cannot be performed, and so forth.

Figure 7:
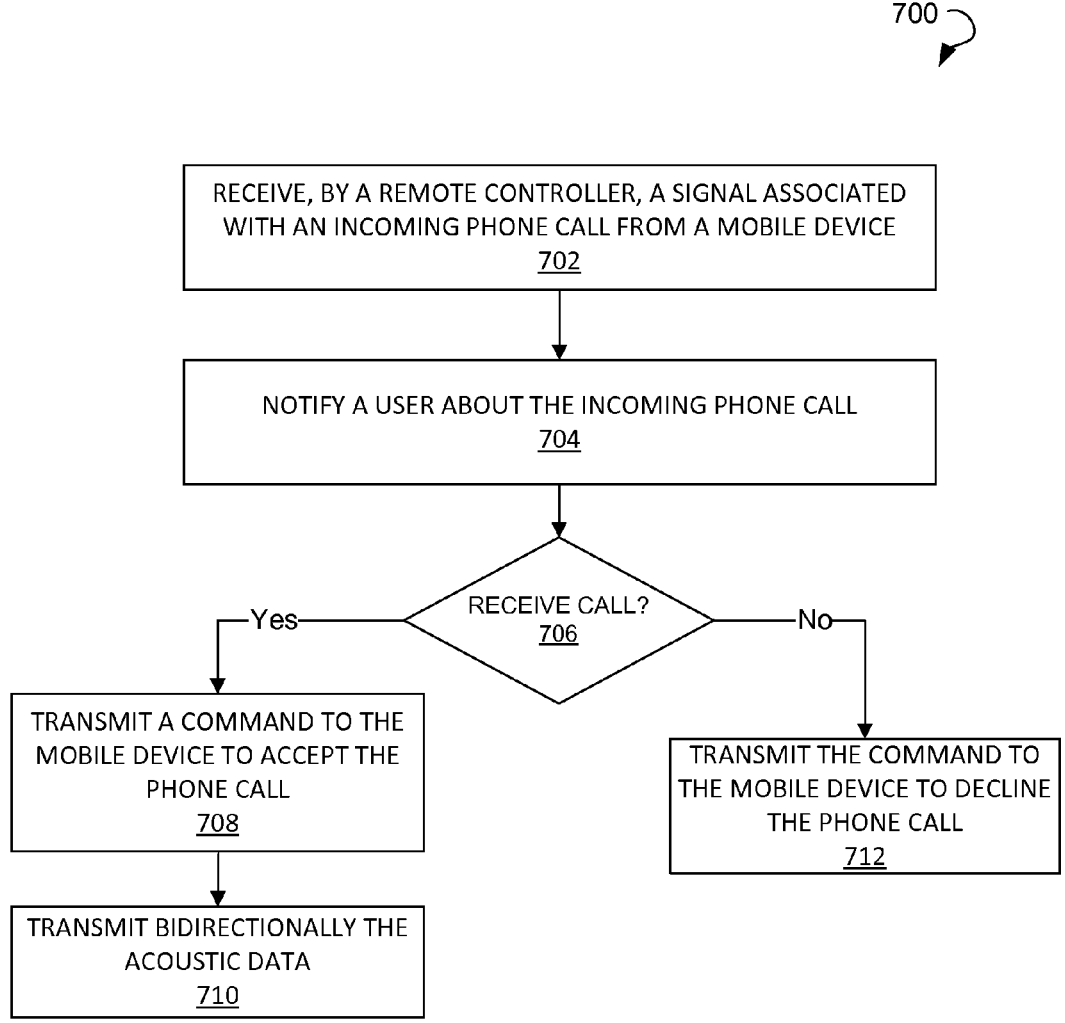
FIG. 7 is a flow chart illustrating a method for controlling a mobile device using a remote controller, in accordance with an example embodiment.

FIG. 7 illustrates an exemplary method 700 for controlling a mobile device using a remote controller. As shown in FIG. 7, the method may commence in operation 702 with the remote controller receiving a signal, indicative of an incoming phone call, from the mobile device. In operation 704, the remote controller may notify a user about the incoming phone call. The notification may be performed by playing a sound using a sound generation device of the remote controller, by displaying information on the screen of the remote controller, or in any other suitable way. In decision block 706, the user may decide to accept the phone call by making an appropriate selection (a command to receive the call). In this case, the remote controller may transmit, in operation 708, a command to the mobile device 102 to receive the call. In operation 710, acoustic data may be transmitted bidirectionally between the remote controller 116 and the mobile device 102.

If, on the other hand, the user decides not to accept the phone call in decision block 706, the user can input a command to reject the phone call. In this case, the remote controller 116 may transmit the command rejecting the phone call to the mobile device 102 in operation 712.

Figure 8:
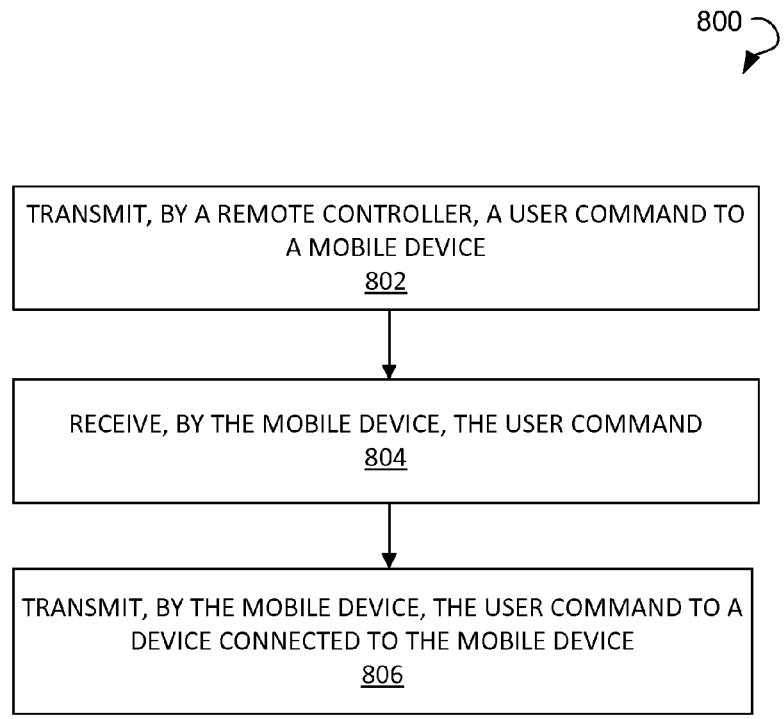
FIG. 8 is a flow chart illustrating a method for controlling a mobile device using a remote controller, in accordance with an example embodiment.

FIG. 8 is a schematic representation 800 of an example method for controlling the mobile device using a remote controller. As shown in FIG. 8, the mobile device 102 may be connected to other devices, such as a TV screen, computer, audio or video system, and so forth. The method may commence in operation 802 with the remote controller 116 transmitting a user command to the mobile device 102. The mobile device 102 may receive the user command at operation 804 and transmit the user command to the device connected to the mobile device 102 at operation 806.

Thus, systems and methods for remote controlling of a mobile device are described. Although embodiments have been described with reference to specific example embodiments, it will be evident that various modifications and changes may be made to these embodiments without departing from the broader spirit and scope of the systems and methods described herein. Accordingly, the specification and drawings are to be regarded in an illustrative rather than a restrictive sense.

What is claimed is:

1. A remote controller for a mobile device comprising:
   a communications transceiver configured for bidirectional communications with the mobile device, the mobile device being a mobile phone;
   a computer processing system communicatively coupled to the communications transceiver, the computer processing system being configured to execute instructions to remotely control one or more applications associated with the mobile device, the mobile device being physically communicatively coupled to a video display device using a micro-Universal Serial Bus (USB) port; and
   one or more actuators communicatively coupled to the computer processing system, the one or more actuators being configured to receive user input, the user input remotely controlling the one or more applications, the one or more actuators being further configured to control the one or more applications by controlling a high definition video stream playback on the video display device, the remote controller providing a user with control of the one or more applications when the mobile device is physically communicatively coupled to the video display device without requiring the user to be proximate to the mobile device.

2. The remote controller of claim 1, wherein the remote controller includes one or more of the following: a touchscreen controller, a LCD driver, an audio digital-to-analog convertor, and a BLUETOOTH transceiver.

3. The remote controller of claim 1, wherein the mobile device is communicatively coupled to a further device using one or more of the following: a High-Definition Multimedia Interface (HDMI) output port and the micro-Universal Serial Bus (USB) port, the micro-Universal Serial Bus (USB) port embedding at least one of a SLIMPORT function and a Mobile High-Definition Link (MHL) function.

4. The remote controller of claim 1, further comprising one or more acoustic transducers communicatively coupled to the computer processing system, the one or more acoustic transducers being configured to enable acoustic communications associated with the mobile device.

5. The remote controller of claim 4, wherein the one or more acoustic transducers include a sound generating device communicatively coupled to the computer processing system.

6. The remote controller of claim 5, wherein the remote controller is configured to cause making and receiving of telephone calls via the mobile device using at least the sound generating device.

7. The remote controller of claim 1, the remote controller further comprising a screen.

8. The remote controller of claim 7, wherein the screen includes one or more of the following: an LCD display and a touch screen.

9. The remote controller of claim 1, wherein the bidirectional communications include wireless communications.

10. The remote controller of claim 9, wherein the wireless communications include one or more of the following technologies: BLUETOOTH, WI-FI, and NFC.

11. The remote controller of claim 1, wherein the one or more actuators are further configured to control the one or more applications by navigating menus.

12. The remote controller of claim 1, wherein the one or more actuators comprise one or more of the following: buttons and a touchscreen.

13. The remote controller of claim 1, wherein the mobile device is communicatively coupled to one or more further remote controllers.

14. A method for controlling a mobile device using a remote controller, the method comprising:
    establishing, via a processor of the remote controller, a communication channel between the remote controller and the mobile device, the mobile device being physically communicatively coupled to a video display device;
    receiving, by the remote controller, one or more commands for controlling the mobile device;
    transmitting, the remote controller via the communication channel, the one or more commands to the mobile device to control at least one application of the mobile device, the at least one application controlling a high definition video stream playback on the video display device; and
    receiving a response, by the at least one application executed by a processor of the mobile device, responsive to the one or more commands, the remote controller providing a user with control of the one or more applications when the mobile device is physically communicatively coupled to the video display device without requiring the user to be proximate to the mobile device.

15. The method of claim 14, wherein the one or more commands are transmitted wirelessly.

16. The method of claim 15, wherein the one or more commands are transmitted using one or more of the following technologies: BLUETOOTH, WI-FI, and NFC.

17. The method of claim 14, wherein the response includes an acoustic signal.

18. The method of claim 14, wherein the one or more commands are inputted via one or more of the following: buttons and a screen of the remote controller.

19. The method of claim 14, wherein the one or more commands are received via one or more actuators.

20. The method of claim 14, further comprising causing establishment of a voice call via the communication channel in response to the one or more commands, the voice call being handled by the remote controller when the mobile device is physically communicatively coupled to the video display device without requiring the user to be proximate to the mobile device.

21. A system for controlling a mobile device using a remote controller comprising:
   a mobile device, the mobile device being a mobile phone and being physically communicatively coupled to a video display device using a micro-Universal Serial Bus (USB) port and being at least one of electrically coupled and magnetically coupled for charging; and
   one or more remote controllers for the mobile device in communication with the mobile device via a wireless protocol, the one or more remote controllers including:
      a communications transceiver configured for bidirectional communications with the mobile device;
      a computer processing system communicatively coupled to the communications transceiver, wherein the computer processing system includes a microcontroller and one or more of the following: a touch controller, an LCD driver, an audio digital-to-analog convertor, a wireless transceiver, the computer processing system being configured to execute instructions to remotely control one or more applications associated with the mobile device;
      one or more actuators communicatively coupled to the computer processing system, the one or more actuators being configured to receive user input, the user input causing commands to be transmitted that remotely control the one or more applications, the one or more actuators being further configured to control the one or more applications by controlling a high definition video stream playback on the video display device, the remote controller providing a user with control of the one or more applications when the mobile device is physically communicatively coupled to the video display device without requiring the user to be proximate to the mobile device; and
      a screen.

22. The system of claim 21, the one or more remote controllers further including one or more acoustic transducers communicatively coupled to the computer processing system, the one or more acoustic transducers being configured to enable acoustic communications associated with the mobile device.

23. The system of claim 21, wherein the mobile device is communicatively coupled to a further device using one or more of the following: a High-Definition Multimedia Interface (HDMI) output port and the micro-Universal Serial Bus (USB) port, the micro-Universal Serial Bus (USB) port embedding at least one of a SLIMPORT function and a Mobile High-Definition Link (MHL) function.

24. The system of claim 21, wherein the bidirectional communications include wireless communications.

25. The system of claim 24, wherein the wireless communications include one or more of the following technologies: BLUETOOTH, WI-FI, and NFC.

26. The system of claim 21, wherein the user input is further configured to control the one or more applications by navigating menus.

* * * * *